United States Patent
McNeil et al.

(10) Patent No.: US 11,416,686 B2
(45) Date of Patent: Aug. 16, 2022

(54) NATURAL LANGUAGE PROCESSING BASED ON USER CONTEXT

(71) Applicant: International Business Machines Corporation, Armonk, NY (US)

(72) Inventors: Kristin E. McNeil, Charlotte, NC (US); Mario J. Lorenzo, Miami, FL (US); Jennifer Lynn La Rocca, Cary, NC (US); Debra L. Angst, Rochester, MN (US); Rebecca Lynn Dahlman, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/985,259

(22) Filed: Aug. 5, 2020

(65) Prior Publication Data

US 2022/0043980 A1 Feb. 10, 2022

(51) Int. Cl.
*G06F 17/00* (2019.01)
*G06F 40/30* (2020.01)
*G06F 40/169* (2020.01)
*G06F 40/20* (2020.01)

(52) U.S. Cl.
CPC .......... *G06F 40/30* (2020.01); *G06F 40/169* (2020.01); *G06F 40/20* (2020.01)

(58) Field of Classification Search
CPC ......... G06F 40/30; G06F 40/20; G06F 40/169
See application file for complete search history.

(56) References Cited

U.S. PATENT DOCUMENTS

| | | | |
|---|---|---|---|
| 7,437,295 B2 | 10/2008 | Pitts, III et al. | |
| 9,342,502 B2* | 5/2016 | Edwards | G06F 40/30 |
| 10,943,072 B1* | 3/2021 | Jaganmohan | G06N 5/041 |
| 11,010,284 B1* | 5/2021 | Santiago | G06F 11/3688 |
| 11,086,911 B2* | 8/2021 | Jagan | G06N 3/006 |
| 11,158,311 B1* | 10/2021 | Zhang | G06F 40/284 |
| 2002/0103917 A1* | 8/2002 | Kay | G06F 16/9535 709/229 |
| 2008/0162471 A1* | 7/2008 | Bernard | G06F 40/30 |
| 2009/0299988 A1 | 12/2009 | Hamilton, II et al. | |
| 2012/0078891 A1* | 3/2012 | Brown | G06F 16/3329 707/723 |
| 2015/0331853 A1* | 11/2015 | Palmonari | G06F 40/20 704/9 |
| 2016/0171062 A1* | 6/2016 | Bute | H04L 67/36 707/722 |

(Continued)

OTHER PUBLICATIONS

Anonymous, "A method and system a Smart Conversational System for dynamic response based on the User's context and queries tailored with user demographic information," IP.com Disclosure No. IPCOM000249562D, Publication Date: Mar. 3, 2017.

*Primary Examiner* — Laurie A Ries
(74) *Attorney, Agent, or Firm* — Cantor Colburn LLP; Kelsey M. Skodje

(57) ABSTRACT

Techniques for natural language processing based on user context include identifying a context of a user and responsive to receiving a request from the user intended for processing by a natural language processing (NLP) model, accounting for the context of the user in relation to the request. A result from the NLP model having accounted for the context of the user is provided.

20 Claims, 7 Drawing Sheets

(56) References Cited

U.S. PATENT DOCUMENTS

| | | | |
|---|---|---|---|
| 2016/0196336 A1* | 7/2016 | Allen | G06F 16/9535 |
| | | | 707/722 |
| 2016/0196491 A1* | 7/2016 | Chandrasekaran | G06F 40/30 |
| | | | 706/50 |
| 2016/0292582 A1 | 10/2016 | Kozloski et al. | |
| 2016/0314106 A1* | 10/2016 | Carrier | G06F 40/189 |
| 2016/0357744 A1 | 12/2016 | Kozloski et al. | |
| 2016/0378852 A1 | 12/2016 | Goldberg et al. | |
| 2017/0323009 A1* | 11/2017 | Byron | G06F 16/3344 |
| 2018/0016003 A1 | 1/2018 | Chefalas et al. | |
| 2018/0053114 A1* | 2/2018 | Adjaoute | G06Q 20/4016 |
| 2018/0082682 A1 | 3/2018 | Erickson et al. | |
| 2018/0150456 A1 | 5/2018 | Kozloski et al. | |
| 2019/0065627 A1 | 2/2019 | De Mel et al. | |
| 2019/0171646 A1* | 6/2019 | Chu-Carroll | G06F 16/24575 |
| 2019/0333512 A1* | 10/2019 | Canim | G06F 16/288 |
| 2020/0202226 A1* | 6/2020 | Nagatani | G06F 16/3329 |
| 2020/0302123 A1* | 9/2020 | Mittal | G06F 40/40 |
| 2021/0034386 A1* | 2/2021 | Ghafourifar | G06F 16/9535 |
| 2021/0217418 A1* | 7/2021 | Wei | G06N 5/041 |
| 2021/0240775 A1* | 8/2021 | Liu | G06F 16/3329 |
| 2021/0279424 A1* | 9/2021 | Galitsky | G06N 20/00 |
| 2021/0382878 A1* | 12/2021 | McElvain | G06N 5/046 |

* cited by examiner

NATURAL LANGUAGE PROCESSING BASED ON USER CONTEXT

BACKGROUND

The present invention generally relates to computer systems, and more specifically, to natural language processing based on user context.

Natural language processing (NLP) is concerned with the interactions between computers and human (natural) languages, particularly how to program computers to process and analyze natural language data. This natural language data can sometimes be questions, where the NLP system is used to answer the questions. An NLP system may build on search engine technology to provide a single answer to a question posed to it in natural language. The NLP system answers natural language questions by querying data repositories and applying elements of language processing, information retrieval, and machine learning to arrive at a conclusion.

SUMMARY

Embodiments of the present invention are directed to NLP based on user context. A non-limiting example computer-implemented method includes identifying a context of a user and responsive to receiving a request from the user intended for processing by a natural language processing (NLP) model, accounting for the context of the user in relation to the request. The computer-implemented method includes providing a result from the NLP model having accounted for the context of the user.

In addition to one or more of the features described above or below, or as an alternative, further embodiments could include where accounting for the context of the user in relation to the request comprising associating a weighted score to one or more candidate results according to the context of the user.

In addition to one or more of the features described above or below, or as an alternative, further embodiments could include where: one or more candidate results each has a weighted score for the context of the user, and accounting for the context of the user in relation to the request comprises selecting the result from the one or more candidate results according to the weighted score.

In addition to one or more of the features described above or below, or as an alternative, further embodiments could include continuously adjusting a user profile of the user as the context of the user changes, the user profile being used to account for the context of the user.

In addition to one or more of the features described above or below, or as an alternative, further embodiments could include updating at least one annotator associated with the NLP model based on the context of the user.

In addition to one or more of the features described above or below, or as an alternative, further embodiments could include where the context of the user is associated with user location, patterns, profession, skill level, and education.

In addition to one or more of the features described above or below, or as an alternative, further embodiments could include sources for the context of the user comprise: a global positioning satellite device, location tracking, unstructured text disseminated by the user, unstructured text received by the user, information read by the user, history of the user, and sensor identification of another person associated with the user.

In addition to one or more of the features described above or below, or as an alternative, further embodiments could include where software is provided as a service in a cloud environment for providing the result from the NLP model having accounted for the context of the user.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide a system and method as a mechanism to modify NLP services based on the context of the user including, for example, the user's location. The NLP model and/or output can be modified based on the context of the user, and this modification can be by weight score and/or by direct NLP model modification. The context of the user can include user location, daily patterns, profession, skill level, education, who the user is with, etc. The NLP model (full or partial) and/or output of the NLP model may be modified based on the identified user's context in real-time and/or near real-time.

Figure 1:
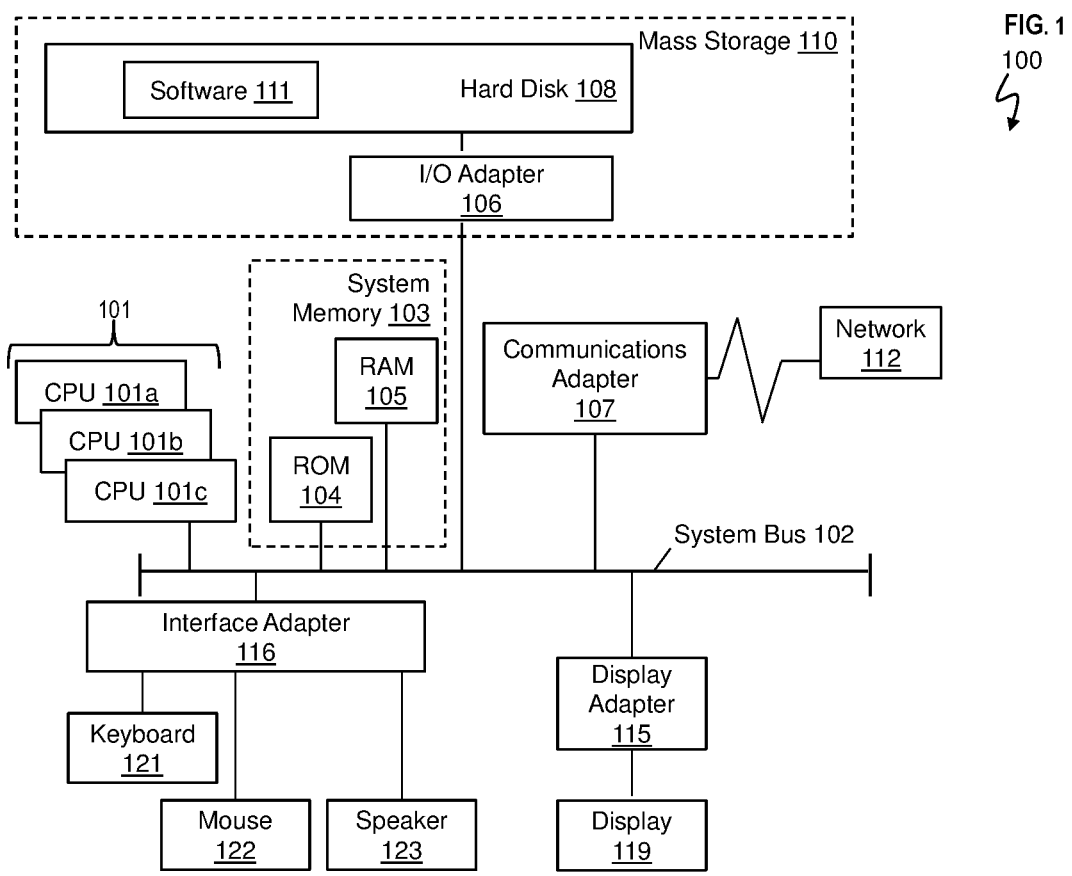
FIG. 1 is a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
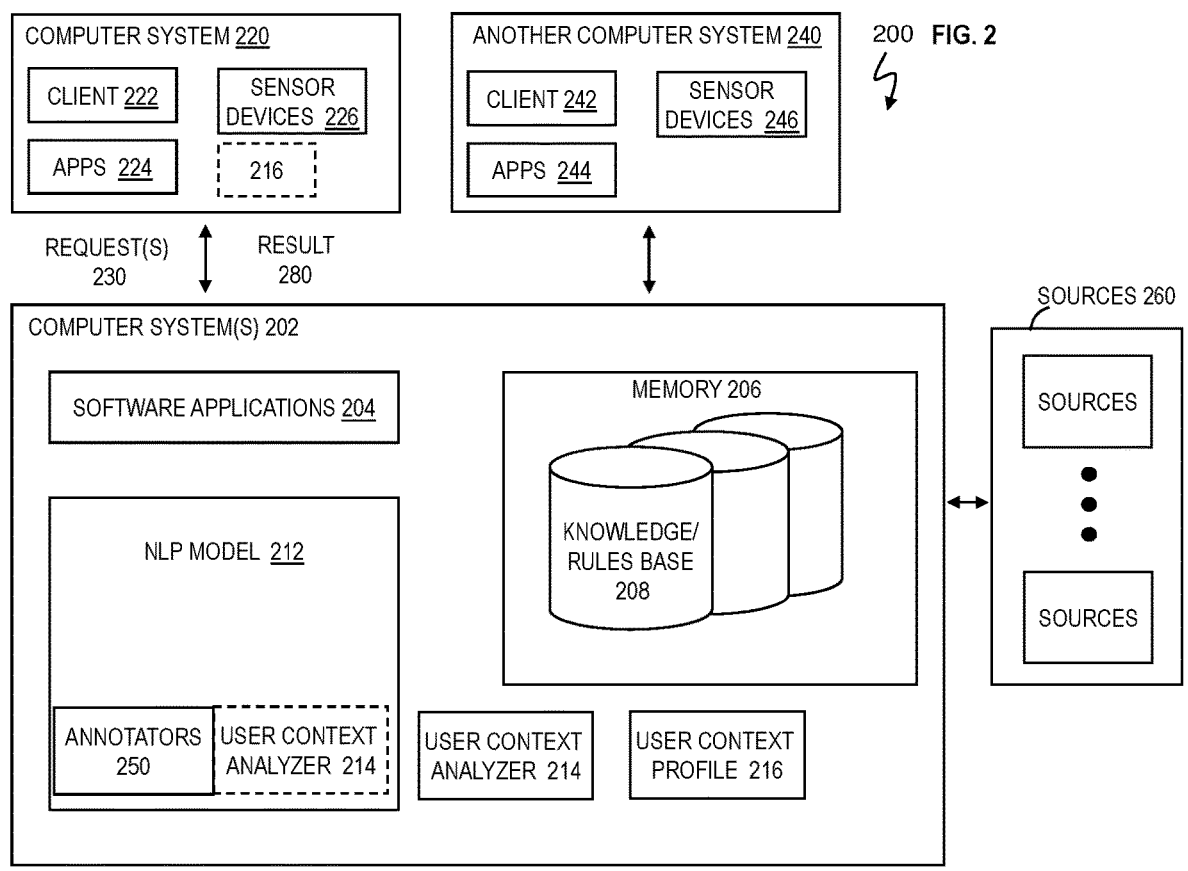
FIG. 2 is a block diagram of a system for natural language processing based on user context in accordance with one or more embodiments of the present invention.
Figure 3:
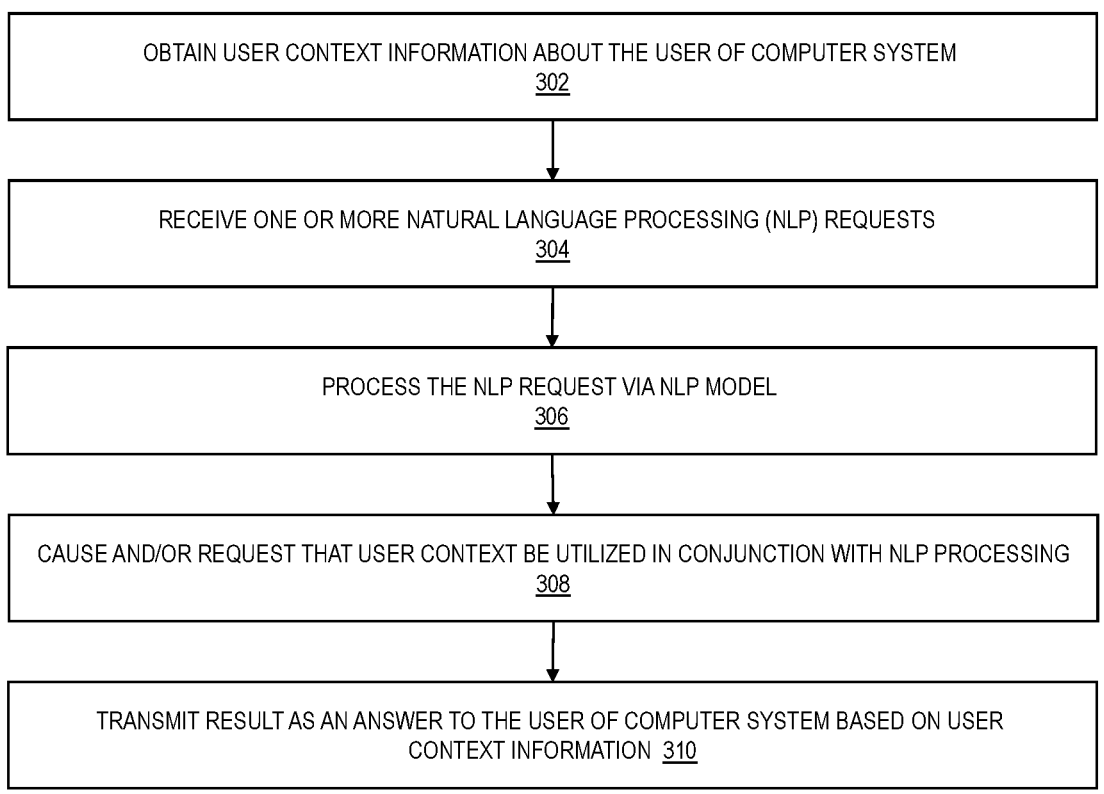
FIG. 3 is a flowchart of a process for natural language processing based on user context in accordance with one or more embodiments of the present invention.

FIG. 2 is a block diagram of a system 200 for natural language processing based on user context (e.g., a user's particular context) in accordance with one or more embodiments of the present invention. FIG. 3 is a flowchart of a process 300 for natural language processing based on user context in accordance with one or more embodiments of the present invention. FIG. 2 depicts one or more computers systems 202 coupled to computer system 220 and another computer system 240. Elements of computer system 100 may be used in and/or integrated into computers systems 202, computer system 220, and computer system 240. Process 300 in FIG. 3 will be described below with reference to FIGS. 2 and 3.

At block 302 of process 300, software application 204 on computer system 202 is configured to obtain (e.g., retrieve, request, and/or scan for) user context information about the user of computer system 220. Software application 204 may be implemented as software 111 executed on one or more processors 101. User context information of the user is any relevant information that can be used to characterize the situation of a user. The user context can be related to the user's physical environment and the user's electronic or virtual environment. Aspects of user context may relate to the following: where the user is, with whom the user is with, and what resources are nearby. The user context information can include, but is not meant to be exhaustive, user location, user profile, people nearby (which can be determined by/from a device nearby such as computer system 240), the current social situation, daily patterns, profession, skill level, education, etc. The context of the user is identified (location, daily patterns, profession, skill level, education, who they are with, etc.) using, for example, user context analyzer 214. Using software application 204, the context can be obtained in various ways including by communicating with a global positioning satellite (GPS) device of computer system 220 and/or another computer system 240, by tracking computer system 220, by performing NLP on the user's unstructured text (e.g., such as text messages, email, voice, etc.) associated with the user of computer system 220 (or attributed to the user), by performing NLP on stories read by the user of computer system 220, by using past history of the user, by interrogating sensor identification the other computer system 240 of another person near the user of computer system 220, etc.

Software application 204 may store user context information of the user of computer system 220 in a user context profile 216. User context profile 216 can store the user context information along with a timestamp for each piece of user context information of the user in one or more relational databases, organized graphs, etc., such that a user context analyzer 214 can determine and maintain the context of the user of computer system 220 in the event the user makes an NLP request 230. User context analyzer 214 may be implemented as and/or use software 111 executed on one or more processors 101. User context analyzer 214 can include one or more models (e.g., including predictive models) for semantic analysis, sentiment analysis, context awareness physical and electronic/virtual, etc., based on the user context information maintained in user context profile 216 and the timeline (based on timestamps) associated with each piece of information, along with real-time and near real-time context information being obtained from computer system 220. Based on the user context information maintained in user context profile 216, user context analyzer 214 can create and determine snapshots of the user along the timeline, and more recent pieces of information are more relevant. A snapshot is a collection of user context information that provides a picture of the user, which may show and/or identify a routine, pattern, and/or intent of the user.

The user context information can be pushed to and/or pulled by software application 204 from computer system 220 including software applications 224 running on computer system 220 and sensor devices 226, from sources 260 which communicate with computer system 220 of the user, and from another computer system 240 of another user different from but in physical proximity to the user of computer system 220. Software applications 224 can be representative of various applications that operate on a computer including map apps, gaming apps, video and music streaming apps, podcasts, social network apps, text apps, email apps, retail store apps (including online shopping, restaurant/food apps, grocery app), book apps, fitness apps, educational apps, search apps, web browsing apps, security apps, etc. Sensor devices 226 can include global positioning system (GPS) devices, microphones, speakers, touch screens, cameras, fitness/smart devices (in and/or coupled to computer system 220), etc. One or more functions and capabilities of computer system 220 can be implemented in smart accessories (e.g., smart glasses, smart watches, etc.), which can connect to computer systems 202 via a network. Also, the smart accessories can be sensor devices 226 connectable to computer system 220 and computer system 202. Client application 222 can be a thin software application configured to extract the user context information on computer system 220 and provide the extracted user context information to software application 204, for any one or more of the software applications 224 and/or sensor devices 226 that do not provide the user context information itself. In one or more embodiments, part of the user context profile 216 may be on the computer system 220 and periodically sent to and/or requested by software application 204 of computer system 202. Client application 242, software applications 244, and sensor devices 246 on computer system 240 are not described and are analogous to client application 222, software applications 224, and sensor devices 226 on computer system 220.

The user of computer system 220 communicates with various sources 260. Sources 260 can be representative of numerous servers and computer systems which provide services including social networking services, social media services, email services, professional services, and other services (e.g., including various websites/Uniform Resource Locators (URLs) over a network like the Internet along with the respective services provided by the websites).

Referring to FIG. 3, at block 304, software application 204 on computer system 202 is configured to receive one or more natural language processing (NLP) requests 230. The NLP requests 230 can be made using software application 204 and/or received from computer system 220. The NLP request 230 can be a question or query made by the user of computer system 220 via client application 222, one or more software applications 224, etc. The NLP request 230 can be a verbal query, for example, spoken in natural language using a microphone of computer system 220, and/or a text query entered using a keyboard or input screen of computer system 220. Client application 222 and software applications 224 may be implemented using software 111 configured to execute on one or more processors 101, as discussed in FIG. 1.

At block 306, software application 204 on computer system 202 is configured to process the NLP request 230 via NLP model 212. Software application 204 is configured to cause speech-to-text recognition to be performed for the NLP request 230 when the NLP request is not in text form. Software application 204, NLP model 212, and/or another software application called by software application 204 may perform speech-to-text recognition. In one or more embodiments, software application 204 has an application programming interface (API) that can interact with and/or call the NLP model 212 to process the NLP request 230, as well can interact with and/or call user context analyzer 214. Natural language processing via NLP model 212 returns insights from the unstructured text (i.e., query in NLP request 230) and/or answers to questions. Rules based NLP is based on a dictionary of terms and language rules (e.g., in knowledge base 208 in memory 206). In addition, there are deep learning contextual annotators (e.g., NLP annotators 250) that extract more insight of the concept in context of the text. The NLP model 212 can be a hybrid natural language processing model which includes the use of rules-based NLP and machining learning NLP. For example, the hybrid model could contain dictionary concepts and language rules in addition to identifying negated terms. One or more embodiments cause the NLP model 212 (including NLP annotators 250) to perform with the highest precision and recall by incorporating user context information (e.g., user location, etc.)

At block 308, software application 204 on computer system 202 is configured to cause and/or request that user context be utilized in conjunction with NLP processing. Software application 204 can check whether user context information is permitted for use with the user of computer system 220, and if authorization is presently and/or previously given by the user, software application 204 is configured to call, request, and/or enable user context analyzer 214. Otherwise, NLP processing by NLP model 212 continues without utilizing user context analyzer 214 when user permission is denied by the user. In some cases, user context analyzer 214 may be continuously running in anticipation of an NLP request.

Figure 4:
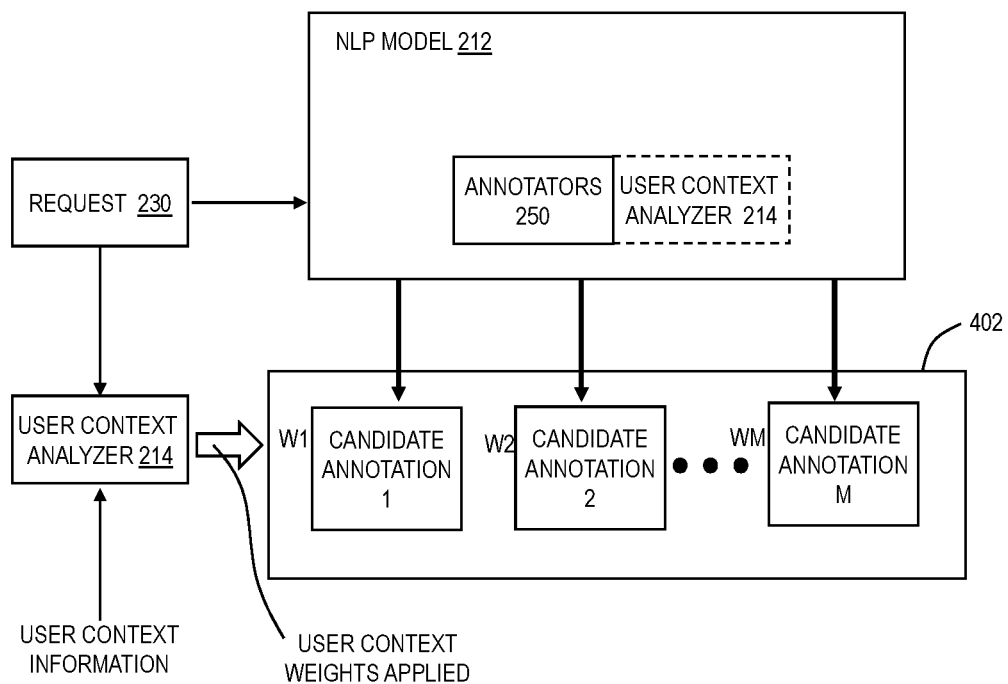
FIG. 4 is a block diagram of weights or weighted scores applied to incorporate user context information in accordance with one or more embodiments of the present invention.

When user context analyzer 214 is employed to analyze the context of the user (i.e., user context information), user context analyzer 214 can be implemented in and/or with NLP annotators 250 to help improve their precision and recall measurements. In one or more embodiments, NLP annotators 250 can be changed themselves based on user context information (e.g., user's location) to perform with the highest precision and recall. Additionally, and/or alternatively, user context analyzer 214 can parse and apply weights to candidate annotations 402 (e.g., candidate answers) output by NLP model 212 based on the user context information, e.g., in user context profile 216. NLP model 212 may output a plurality of candidate annotations 402 (as depicted in FIG. 4) such as candidate annotations 1-M, where M represents the last number of candidate annotations. Each of the candidate annotations 402 is a possible candidate answer to the NLP request 230 received from the user. The user context analyzer 214 can scan each of the candidate annotations 402 for terms that relate to and/or are in the user context information (which can include performing semantic analysis between the terms in the candidate annotations 402 and terms in the user context information to find relationships), and apply a weight accordingly. The more likelihood (i.e., more probable) the terms in a given candidate annotation 402 relate to and/or are in the user context information for the user of computer system 220, the greater the value for the weight (W) applied to that given candidate annotation 402. Conversely, the less likelihood (i.e., less probable) the terms in a given candidate annotation 402 relate to and/or are in the user context information for the user of computer system 220, the lower the value for the weight applied to that particular candidate annotation 402. In one or more embodiments, the user context analyzer 214 can apply a negative value to the weight when the user context analyzer 214 determines that the given candidate annotation 402 has a contrary meaning and/or contrary relationship to the user context information. Each candidate annotation 402 has its own weight or weight score, such as weights W1-WM respectively corresponding to candidate annotations 1-M.

Various examples and scenarios are discussed below for explanation purposes and ease of understanding but not limitation. For example, software application 204 and/or user context analyzer 214 may determine that the user is at a doctor's office based on analyzing the user context information. Accordingly, user context analyzer 214 is configured to change one or more sources 260 (the sources are not limited to social media related to the user but can include various corpora) and/or one or more knowledge bases 208 to medical knowledge bases and medical sources in accordance with the user context information. Therefore, the result 280 is based on user context according to the user context information. As another example, software application 204 and/or user context analyzer 214 may determine that the user is at retail store based on analyzing the user context information. Accordingly, user context analyzer 214 is configured to change one or more annotators 250 to other more preferred annotators 250. Although the user can be a physical location, software application 204 and/or user context analyzer 214 may determine that the user is at virtual location. For example, software application 204 and/or user context analyzer 214 may determine that the user is virtually on the web, in social media, and/or in chat. Depending on where the user is virtually located, user context analyzer 214 is configured to change one or more annotators 250 to other more preferred annotators 250 which can provide information to enhance the interpretation of their question at the virtual location.

As an example, the user may search for "apple" on computer system 220, and user context analyzer 214 is configured to output results based on whether or not the user is close to an Apple® store (or other technology store) or at/near a grocery store. Accordingly, user context analyzer 214 is configured to increase the weight or weighted score for candidate annotations 402 related to technological products (e.g., such as Apple® products) when the user context indicates that the user is close to an Apple® store (or technology store). On the other hand, user context analyzer 214 is configured to increase the weight or weighted score for candidate annotations 402 related to types of apples when the user context indicates that the user is close to the grocery store.

Also, software application 204 and/or user context analyzer 214 may determine the skill level of the user with respect to one or more types of skills based on identified user context information for a category. For example, software application 204 and/or user context analyzer 214 may determine that skill level=low with respect to location category=bank. Based on the identified context information and category, user context analyzer 214 may change the NLP model or portions of the NLP model. This can occur by weighted scores being changed for certain concepts, dictionaries (i.e., in the knowledge base 208 and/or sources 260), rules, or machine learning patterns. Also, user context analyzer 214 can increase the weight or weighted score for candidate annotations 402 related to skill level=low and location category=bank. This can be accomplished by increasing the weight or weighted score for candidate annotations 402 that provide detailed explanation of the queried subject (e.g., loans, investments, etc.) related to the bank, while candidate annotations 402 that are less detailed or unrelated are given a lower weight or weighted score. Therefore, the candidate annotation 402 having the highest/best weight or weighted score is selected as the result 280 for the user.

Updates to the NLP model 212 in accordance with user context information are automatic, and the updated NLP model 212 is deployed and run. The user's request for natural language processing (e.g., question, search, etc.) is analyzed using the real-time updated NLP model 212. Although individual examples have been discussed, it should be appreciated that the user context features from multiple examples can be combined in any manner according to one or more embodiments.

FIG. 4 depicts a block diagram of weights or weighted scores being applied to incorporate user context information in accordance with one or more embodiments of the invention. As noted above, user context analyzer 214 can be utilized to modify NLP annotators 250 of NLP model 212 and/or to modify the output of the NLP model 212. When modifying the NLP annotators 250, the user context analyzer 214 can adjust one or more components of the NLP annotators 250. FIG. 4 shows each candidate annotation 402 with its respective weight W. For example, weight W1 is applied to candidate annotation 1, weight W2 is applied to candidate annotation 2, through weight WM applied to candidate annotation M. Also, the NLP model 212 can be dynamically configured by the user context analyzer 214 through the use of NLP annotators 250 and context-specific artifacts. For example, given a user's context, the NLP model 212 can be configured to include a list of assets relevant to the user's context, such as a dictionary of terms relevant to banking. These alternate assets, such as a dictionary (list of phrases for a particular concept), could then change the output result of the model's annotators since they are building blocks into the NLP model 212. Additionally and/or alternatively, the user context analyzer 214 can apply the weights W to each candidate annotation 402 after NLP processing by the NLP model 212. Also, user context analyzer 214 can parse text of the NLP request 230 and compare user context information of the user to text in the NLP request 230 to determine if insights and/or relationships can be found between the text of the NLP request 230 and user context information. The user context analyzer 214 can use these insights and relationships between the NLP request 230 and user context information to apply the weights W to candidate annotations 402. For example, in addition to determining that terms in a given candidate annotation 402 relate to and/or are in the user context information which causes the value of the weight W for that candidate annotation 402 to increase accordingly, user context analyzer 214 may also determine that the insights and/or relationships between text of the NLP request 230 and user context information are found in and/or relate to the given candidate annotation 402 which causes the value of the weight W for the given candidate annotation 402 to further increase.

Referring back to FIG. 3, at block 310, software application 204 on computer system 202 is configured to transmit result 280 as an answer to the user of computer system 220 based on user context information. The answer is one of the candidate annotations 402 having the best user context corresponding to the highest weight W. In cases where there is a tie or a statistical tie between candidate annotations 402, user context analyzer 214 is configured to break the tie based on how closely the candidate annotations 402 match and/or relate to the most recent user context information on the timeline. As noted above, software application 204 and/or user context analyzer 214 maintain a timeline of entries for user context information including snapshots in user context profile 216, and some entries are more recent than others on the timeline. In cases where there is a tie or a statistical tie between candidate annotations 402, user context analyzer 214 is configured to break the tie based on how closely the candidate annotations 402 match and/or relate to the more recent entries on the timeline. As such, the candidate annotation 402 matching and/or relating to the more recent entries on the timeline is selected as the result 280 (i.e., the answer). Additionally, when generating the weights or weighted scores, user context analyzer 214 can assign a higher value to candidate annotations 402 that match and/or relate to more recent entries on the timeline.

Figure 5:
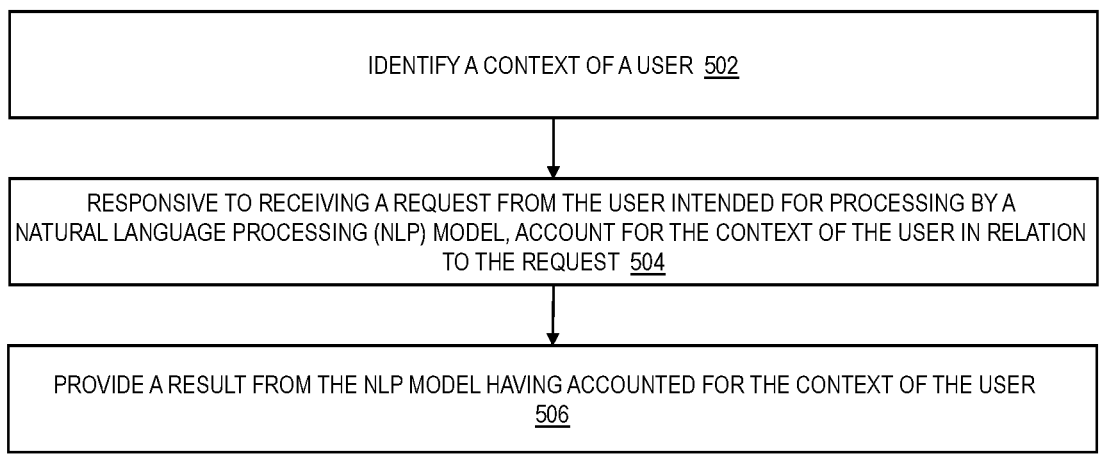
FIG. 5 is a flowchart of a computer-implemented method for natural language processing based on user context in accordance with one or more embodiments of the present invention.

FIG. 5 is a flowchart of a computer-implemented method 500 for natural language processing based on user context based on natural language processing model enhancements according to one or more embodiments. Software application 204 may perform various operation and may call, employ, and/or request the services of the NLP model 212 and user context analyzer 214. At block 502, software application 204 on computer system 202 is configured to identify a context (e.g., using user context information) of a user. At block 504, responsive to receiving a request (e.g., NLP request 230) from the user intended for processing by a natural language processing (NLP) model 212, software application 204 on computer system 202 is configured to account for the context of the user in relation to the request (e.g., NLP request 230). At block 506, software application 204 on computer system 202 is configured to provide a result 280 from the NLP model 212 having accounted for the context of the user.

Accounting (via user content analyzer 214) for the context of the user in relation to the request (e.g., NLP request 230) comprises associating a weighted score to one or more candidate results (e.g., candidate annotations 402) according to the context of the user. One or more candidate results (e.g., candidate annotations 402) each has a weighted score for the context of the user. Accounting for the context of the user in relation to the request comprises selecting the result 280 from the one or more candidate results (e.g., candidate annotations 402) according to the highest weighted score. Continuously adjusting a user profile (e.g., information and/or snapshots in user context profile) of the user as the context of the user changes, the user profile being used to account for the context of the user. Updating at least one annotator associated with the NLP model based on the context of the user. The context (e.g., user context information) of the user is associated with user location, daily patterns, profession, skill level, and education. Sources for the context of the user comprise: a global positioning satellite device, location tracking, unstructured text disseminated by the user, unstructured text received by the user, information read by the user, past history of the user, and sensor identification of another person associated with the user. Software is provided as a service in a cloud environment for providing the result from the NLP model having accounted for the context of the user.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
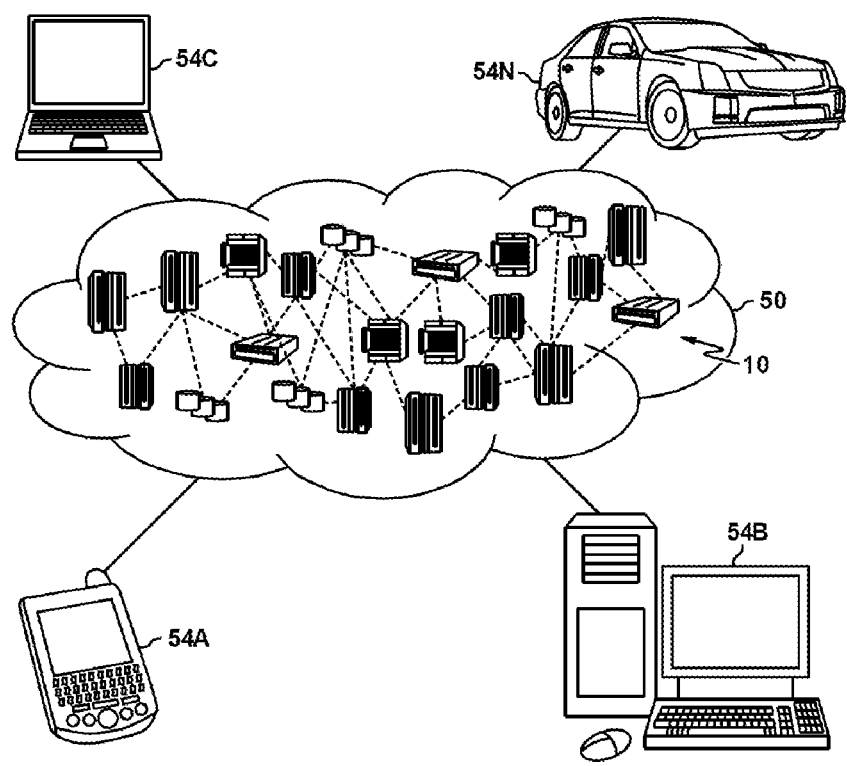
FIG. 6 depicts a cloud computing environment according to one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
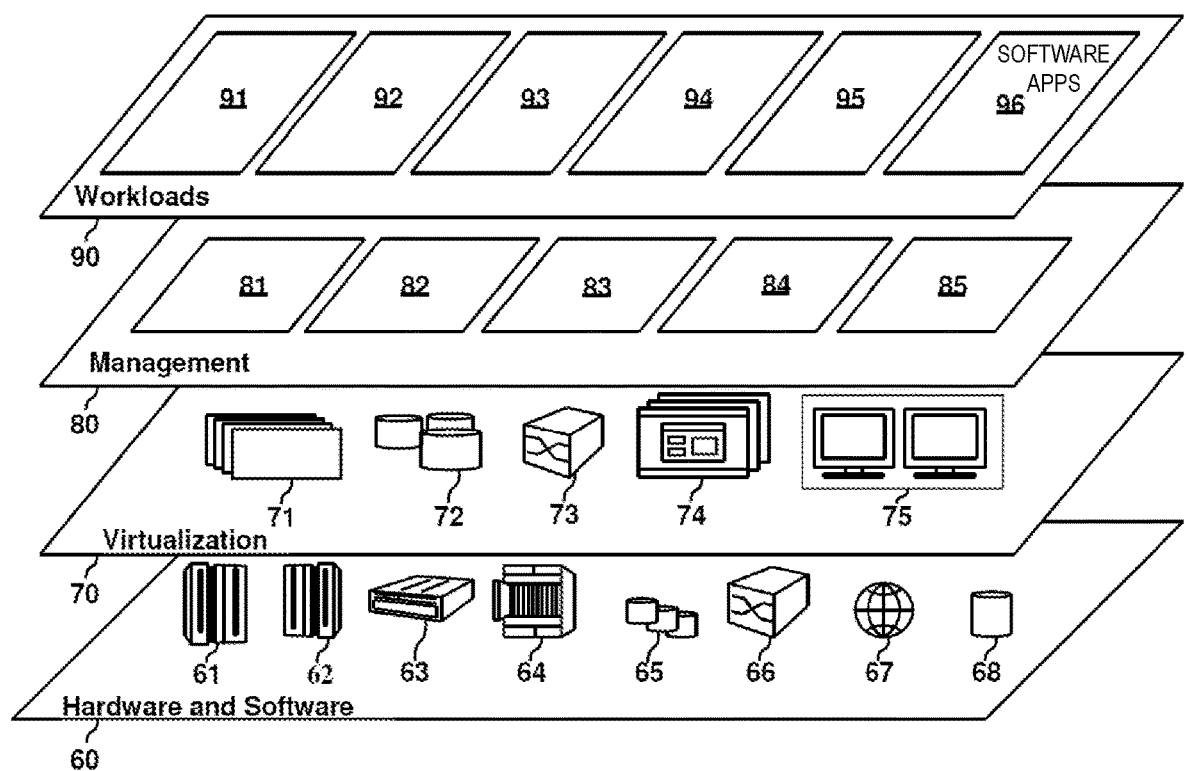
FIG. 7 depicts abstraction model layers according to one or more embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., software applications 204, NLP model 212, and user context analyzer 214) implemented in workloads and functions 96. Also, the software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    identifying a context of a user;
    responsive to receiving a request from the user intended for processing by a natural language processing (NLP) model, accounting for the context of the user in relation to the request, accounting for the context including analyzing the context to determine a proximity of the user to an entity at a time of the request in order to differentiate use of a term in the request; and providing a result from the NLP model having accounted for the context of the user including the proximity used to differentiate use of the term, wherein the result is supplied as an answer to the request to be output to the user in which the answer is selected from one or more candidate results based on the context of the user.

2. The computer-implemented method of claim 1, wherein accounting for the context of the user in relation to the request comprises associating a weighted score to the one or more candidate results as potential answers to the request according to the context of the user.

3. The computer-implemented method of claim 1, wherein:
the one or more candidate results are potential answers to the request, in which each of the one or more candidate results has a weighted score for the context of the user; and
accounting for the context of the user in relation to the request comprises selecting the result from the one or more candidate results according to the weighted score.

4. The computer-implemented method of claim 1, further comprising continuously adjusting a user profile of the user as the context of the user changes, the user profile being used to account for the context of the user.

5. The computer-implemented method of claim 1, further comprising updating at least one annotator associated with the NLP model based on the context of the user.

6. The computer-implemented method of claim 1, wherein the context of the user is associated with one or more of user location, patterns, profession, skill level, and education.

7. The computer-implemented method of claim 1, wherein sources for the context of the user comprise one or more of: a global positioning satellite device, location tracking, unstructured text disseminated by the user, unstructured text received by the user, information read by the user, past history of the user, and sensor identification of another person associated with the user.

8. The computer-implemented method of claim 1, wherein software is provided as a service in a cloud environment for providing the result from the NLP model having accounted for the context of the user.

9. A system comprising:
a memory having computer readable instructions; and
one or more processors for executing the computer readable instructions, the computer readable instructions controlling the one or more processors to perform operations comprising:
identifying a context of a user;
responsive to receiving a request from the user intended for processing by a natural language processing (NLP) model, accounting for the context of the user in relation to the request, accounting for the context including analyzing the context to determine a proximity of the user to an entity at a time of the request in order to differentiate use of a term in the request; and
providing a result from the NLP model having accounted for the context of the user including the proximity used to differentiate use of the term, wherein the result is supplied as an answer to the request to be output to the user in which the answer is selected from one or more candidate results based on the context of the user.

10. The system of claim 9, wherein accounting for the context of the user in relation to the request comprises associating a weighted score to the one or more candidate results as potential answers to the request according to the context of the user.

11. The system of claim 9, wherein:
the one or more candidate results are potential answers to the request, in which each of the one or more candidate results has a weighted score for the context of the user; and
accounting for the context of the user in relation to the request comprises selecting the result from the one or more candidate results according to the weighted score.

12. The system of claim 9, further comprising continuously adjusting a user profile of the user as the context of the user changes, the user profile being used to account for the context of the user.

13. The system of claim 9, further comprising updating at least one annotator associated with the NLP model based on the context of the user.

14. The system of claim 9, wherein:
the context of the user is associated with one or more of user location, patterns, profession, skill level, and education; and
sources for the context of the user comprise one or more of: a global positioning satellite device, location tracking, unstructured text disseminated by the user, unstructured text received by the user, information read by the user, history of the user, and sensor identification of another person associated with the user.

15. A computer program product comprising a computer readable storage medium having program instructions embodied therewith, the program instructions executable by a processor to cause the processor to perform operations comprising:
identifying a context of a user;
responsive to receiving a request from the user intended for processing by a natural language processing (NLP) model, accounting for the context of the user in relation to the request, accounting for the context including analyzing the context to determine a proximity of the user to an entity at a time of the request in order to differentiate use of a term in the request; and
providing a result from the NLP model having accounted for the context of the user including the proximity used to differentiate use of the term, wherein the result is supplied as an answer to the request to be output to the user in which the answer is selected from one or more candidate results based on the context of the user.

16. The computer program product of claim 15, wherein accounting for the context of the user in relation to the request comprises associating a weighted score to the one or more candidate results as potential answers to the request according to the context of the user.

17. The computer program product of claim 15, wherein:
the one or more candidate results are potential answers to the request, in which each of the one or more candidate results has a weighted score for the context of the user; and
accounting for the context of the user in relation to the request comprises selecting the result from the one or more candidate results according to the weighted score.

18. The computer program product of claim 15, further comprising continuously adjusting a user profile of the user as the context of the user changes, the user profile being used to account for the context of the user.

19. The computer program product of claim 15, further comprising updating at least one annotator associated with the NLP model based on the context of the user.

20. The computer program product of claim 15, wherein the context of the user is associated with user location, patterns, profession, skill level, and education.

* * * * *